United States Patent
Kim et al.

(10) Patent No.: US 8,270,614 B2
(45) Date of Patent: Sep. 18, 2012

(54) METHOD OF UPDATING GROUP KEY AND GROUP KEY UPDATE DEVICE USING THE SAME

(75) Inventors: Dae Youb Kim, Seoul (KR); Mi Suk Huh, Suwon-si (KR); Tae-Chul Jung, Seongnam-si (KR); Hwan Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 11/819,255

(22) Filed: Jun. 26, 2007

(65) Prior Publication Data

US 2008/0118068 A1    May 22, 2008

(30) Foreign Application Priority Data

Nov. 16, 2006    (KR) .................. 10-2006-0113438

(51) Int. Cl.
*H04L 9/08*    (2006.01)
(52) U.S. Cl. .......................................... 380/278
(58) Field of Classification Search .................. 380/278
See application file for complete search history.

(56) References Cited

U.S. PATENT DOCUMENTS

| | | | |
|---|---|---|---|
| 5,261,088 A * | 11/1993 | Baird et al. | 1/1 |
| 7,007,040 B1 | 2/2006 | Duke et al. | 707/200 |
| 7,043,024 B1 * | 5/2006 | Dinsmore et al. | 380/278 |
| 2005/0018853 A1 * | 1/2005 | Lain et al. | 380/277 |
| 2005/0271210 A1 * | 12/2005 | Soppera | 380/277 |

FOREIGN PATENT DOCUMENTS

| | | |
|---|---|---|
| JP | 2004-350267 | 9/2004 |
| JP | 2005-159780 | 6/2005 |
| KR | 10-2002-0081246 | 10/2002 |
| KR | 10-2003-0007775 | 1/2003 |
| KR | 1-20040107698 | 12/2004 |
| KR | 1020060050505 | 5/2006 |
| KR | 1020060031257 | 12/2006 |

* cited by examiner

*Primary Examiner* — Cordelia Zecher
(74) *Attorney, Agent, or Firm* — NSIP Law

(57) ABSTRACT

A group key update method and a group key update apparatus for updating a key of members in a group are provided. The group key update method includes selecting a sub-root node among nodes on the binary tree; performing a node change with respect to the group according to a type of the sub-root node, and generating a changed binary tree; and performing a node key update with respect to the changed binary tree.

28 Claims, 17 Drawing Sheets

METHOD OF UPDATING GROUP KEY AND GROUP KEY UPDATE DEVICE USING THE SAME

CROSS-REFERENCE TO RELATED APPLICATION

This application claims the benefit under 35 U.S.C. §119 (a) of Korean Patent Application No. 10-2006-0113438, filed on Nov. 16, 2006, in the Korean Intellectual Property Office, the entire disclosure of which is hereby incorporated by reference.

BACKGROUND OF THE INVENTION

1. Field of the Invention

The present invention relates to a group key update method and system which updates a key of members in a group. More particularly, the present invention relates to a group key update method and a group key update apparatus which can effectively update a key of group members when at least two group members simultaneously leave the group via a batch processing.

2. Description of Related Art

Contents which are provided to group members are typically encrypted, so that other users can not use the contents. Accordingly, all of the group members should have an encryption key, provided from a server, capable of decoding the encrypted contents.

Accordingly, updating an encryption key is an important issue. For example, when a new member joins a group, the group is required to allow the new member to restrictively access contents. Later, after the new member joins the group, when the existing group members update the encryption key, the new member may share the updated key.

Also, when one of the existing group members leaves the group, the group key, used by all group members before the leaving member leaves the group, is required to be updated so that the leaving member no longer has access to the contents.

Generally, methods of updating the group key are performed in two ways.

In one method, a server calculates an updated key and transmits the updated key to a member requiring the updated key, when it is required to update a group key. This method is problematic due to the great burden placed upon the server since the server is required to calculate the group key for all group members who require the updated group key, and then transmit the calculated group key.

In another method, members that are capable and require the update voluntarily calculate the group key and perform a required update, while the server transmits the updated key to only those members incapable of performing a self-update when it is required to update the group key. In the case of this method, the burden placed upon the server is not great since the server calculates to transmit the updated group key to only those members incapable of performing the self-update. However, it is quite difficult for the members that require the update to effectively self-update the group key.

Further, group key updating is more complex when at least two members simultaneously join the group, and the problem of repeatedly updating an updated key may occur.

Accordingly, there is a need for an improved method and apparatus thereof for effectively updating the group key to be capable of performing a self-update.

SUMMARY OF THE INVENTION

General aspects address at least the above problems and/or disadvantages. Accordingly, a general aspect provides a group key update method and a group key update apparatus which can effectively perform a self update.

A general aspect of also provides a group key update method and a group key update apparatus which can effectively provide members incapable of performing a self update with a necessary key.

A general aspect of also provides a group key update method and a group key update apparatus which can effectively select a node that is necessary for a self update, and perform a key update with respect to the selected node.

A general aspect of also provides a group key update method and a group key update apparatus which can effectively perform a change of a tree structure depending on multi-leave by using a sub-root node.

According to a general aspect, there is provided a group key update method including selecting a sub-root node among nodes on the binary tree, performing a node change with respect to the group according to a type of the sub-root node, and generating a changed binary tree, and performing a node key update with respect to the changed binary tree.

The method may further include that the sub-root node may be any one of a highest level node among ancestor nodes whose descendent leaf node members all leave, and a highest level node among ancestor nodes whose descendent leaf node members all leave with the exception of one leaf node member.

The method may further include that the generating of the changed binary tree replaces a parent node of the sub-root node with a sibling node of the sub-root node when the sub-root node is the highest level node among ancestor nodes whose descendent leaf node members all leave, and changes the descendant nodes to be a descendant node corresponding to the parent node of the sub-root node when a descendant node of the sibling node exists.

The method may further include that when the sub-root node is the a top node of ancestor nodes whose descendent leaf node members all leave with the exception of one leaf node, the generating of the changed binary tree changes the sub-root node to be the leaf node, and changes a member corresponding to the one leaf node to be a member corresponding to the sub-root node.

According to another general aspect, there is provided a group key update method, including selecting an update target node corresponding to the multi-leave among nodes on the binary tree, and updating a key of the update target node by updating a key of the parent node of the node corresponding to an updated key, using an updated key.

According to another general aspect, there is provided a group key update apparatus, including a sub-root node selection module selecting a sub-root node among nodes on the binary tree, a node change module performing a node change with respect to the group according to a type of the sub-root node, and generating a changed binary tree, and a node key update module performing a node key update with respect to the changed binary tree.

Other aspects will become apparent to those skilled in the art from the following detailed description, which, taken in conjunction with the annexed drawings, discloses general aspects of the invention.

BRIEF DESCRIPTION OF THE DRAWINGS

The above and other general aspects will be more apparent from the following detailed description, taken in conjunction with the accompanying drawings in which.

Throughout the drawings, the same drawing reference numerals will be understood to refer to the same elements, features, and structures.

DETAILED DESCRIPTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
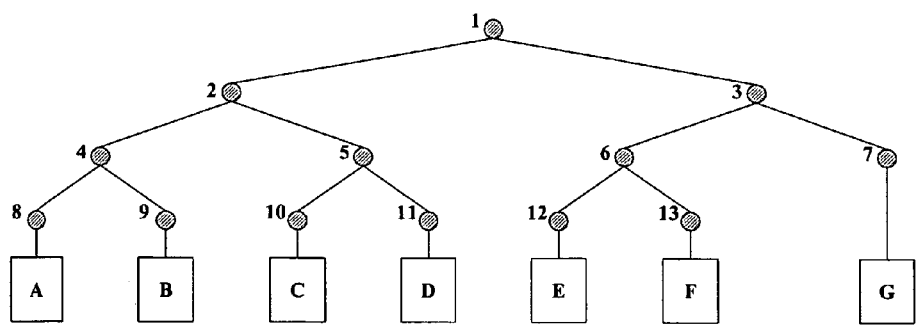
FIG. 1 is an example of a diagram illustrating a binary tree corresponding to an example of a group according to a general aspect.

FIG. 1 is a diagram illustrating a binary tree corresponding to an example of a group according to a general aspect.

Referring to FIG. 1, group members A, B, C, D, E, F, and G respectively correspond to each leaf node of the binary tree.

In this case, each of the group members A, B, C, D, E, F, and G may correspond to a device or a user.

Each leaf node of the binary tree has its own encryption key.

A key of a root node is used for transmitting contents. Namely, the contents, which are transmitted from a server, are encrypted to be transmitted to the key of the root node.

In the binary tree, a key corresponding to nodes, other than the root node, is used for updating a node key. In a general aspect, the key corresponding to nodes, other than the root node, is used for updating a key of a parent node of a corresponding node.

A key of the leaf node may be established as a member key of a corresponding member.

Each of the group members A, B, C, D, E, F, and G stores a node key of all nodes on a path from the leaf node to the root node.

Specifically, the member A stores the node key of node 8, node 4, node 2 and node 1. Also, the member F stores the node key of node 13, node 6, node 3 and node 1.

Figure 2:
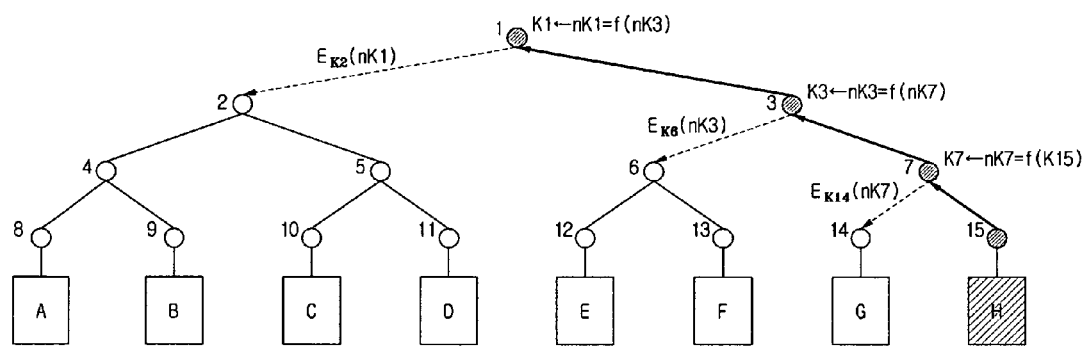
FIG. 2 is a diagram illustrating the binary tree when a new member joins the group of FIG. 1.

FIG. 2 is a diagram illustrating the binary tree when a new member joins the group of FIG. 1.

In FIG. 2, a thick line indicates a self-update path and a dotted line indicates an update path transmitted from a server.

Referring to FIG. 2, node 7 is split to generate nodes 14 and 15 when a new group member H joins the group. In this case, a node corresponding to a member G changes from node 7 to node 14.

Node 15 becomes a node corresponding to the new member H.

When a new member joins the group, the split node is determined as a node, having a node ID that is a minimum or a maximum, when the binary tree is a complete binary tree. Also, when the new member joins the group, the split node is selected as a node where a depth of the leaf nodes is minimum, and is determined as a node, having a node ID that is a minimum or a maximum from the selected node, when the binary tree is not a complete binary tree.

Node 15, corresponding to the new member H, is determined as an updating start node when the new member H joins the group.

A node key of the update start node 15 is established as a member key of the member H. The member key may be shared by a server and a member before updating the node key. When the node key of node 15 is determined, a node key of node 7 is updated using the node key of node 15. In this case, the node key of node 7 may be established as an output of a one-way function with respect to the node key of node 15. As an example, assuming that the node key of node 15 is K15, an update value nK7 of the node key K7 of the node 7 may be established as f(K15). In this case, f( ) indicates the one-way function. In addition to the node key values, updating information values, such as an update date and a number of updates, are included in input values of the function f. Hereinafter, f(K) indicates f(K, update information).

Also, when the node key of node 7 is updated, a node key of node 3 is updated using the node key of node 7. In this case, the node key of node 3 may be established as an output of the one-way function with respect to the key of node 7. As an example, assuming that the node key of node 7 is K7, an update value nK3 of node key K3 of node 3 may be established as f(K7).

Also, when the node key of node 3 is updated, a node key of node 1 is updated using the node key of node 3. In this case, the node key of node 1 may be established as an output of the one-way function with respect to the node key of node 3. As an example, assuming that the node key of node 3 is K3, an update value nK1 of node key K1 of node 1 may be established as f(K3).

Consequently, as illustrated in FIG. 2, a self-update is performed along a path from node 15 through node 1, passing through nodes 7 and 3.

In this case, the server encrypts the updated key of node 7 to transmit to the member G corresponding to node 14 since the member G does not know the updated key of node 7. In this case, the updated key of node 7 is encrypted to transmit to node 14. The member G which has received the key of node 7 may sequentially calculate the keys of nodes 1 and 3 using the one-way function.

Also, the server may encrypt the updated key of node 3 to transmit to the members E and F corresponding to the descendent nodes of node 6 since the members E and F do not know the updated key of node 3. In this case, the key of updated node 3 is encrypted to transmit to node 6. In this case, the members E and F, which have received the key of node 3, may calculate the key of node 1 using the one-way function.

Also, the server may encrypt the updated key of node 1 to transmit to the members A, B, C, and D corresponding to the descendent nodes of node 2 since the members A, B, C, and D do not know the updated key of node 1. In this case, the updated key of node 1 is encrypted to transmit to node 2. Due to a feature of the one-way function, the members A, B, C, and D corresponding to the descendent nodes of node 2 do not know the keys of nodes 3, 7 and 15 using the updated key of node 1.

Figure 3:
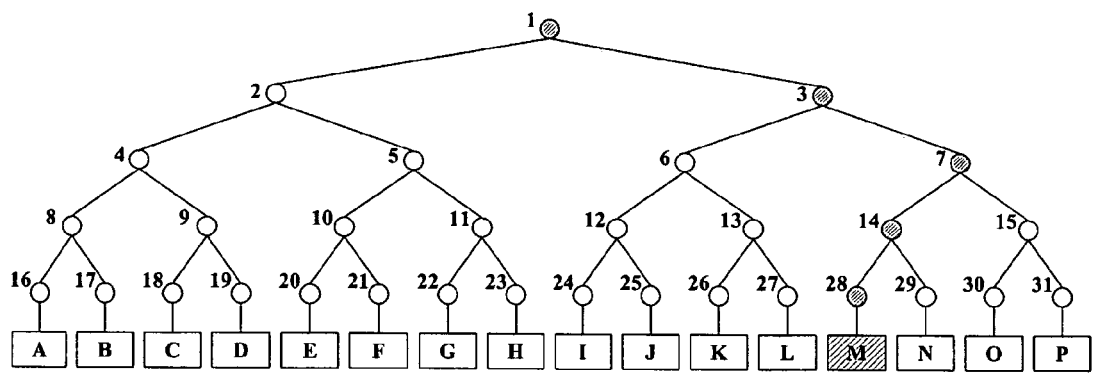
FIG. 3 is a diagram illustrating a binary tree corresponding to another example of a group of another general aspect.

FIG. 3 is a diagram illustrating a binary tree corresponding to another example of a group according to another general aspect.

Referring to FIG. 3, a self-update path which connects nodes 14, 7, 3, and 1 is established when an existing member M of the group leaves the group.

In this case, node 14 is established as an update start node, and a node key update is performed along parent nodes, from node 14 to a root node.

Figure 4:
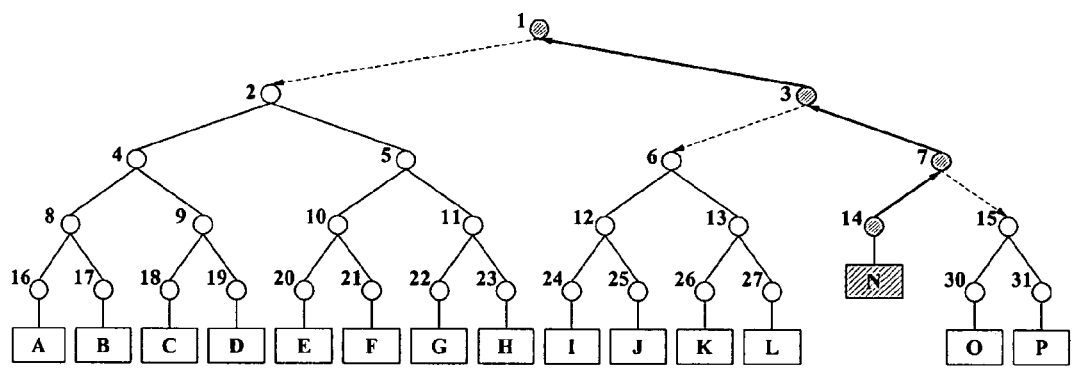
FIG. 4 is a diagram illustrating the binary tree when an existing member leaves the group of FIG. 3.

FIG. 4 is a diagram illustrating the binary tree when an existing group member leaves the group of FIG. 3.

Referring to FIG. 4, when the member M leaves the group, nodes 28 and 29 are deleted, and node 14 becomes a node corresponding to a member N. In this case, node 14 becomes an update start node.

A key of node 14 is established as a member key of the member N. An updating process of a self-update path that follows from node 14, node 7, node 3 and node 1 is identical as illustrated through FIGS. 1 and 2.

Namely, a key of node 7 is updated using a key of node 14. In this case, the key of node 7 may be established as an output of the one-way function with respect to the key of node 14. As an example, assuming that the node key of node 14 is K14, an update value nK7 of the node key K7 of node 7 may be established as f(K14). In this case, f( ) indicates the one-way function.

Also, when the node key of node 7 is updated, a node key of node 3 is updated using the node key of node 7. As an example, assuming that the node key of node 7 is K7, an update value nK3 of the node key K3 of node 3 may be established as f(K7).

Also, when the node key of node 3 is updated, the node key of node 1 is updated using the node key of node 3. In this case, a node key of node 1 may be established as an output of the one-way function with respect to the node key of node 3. As an example, assuming that the node key of node 3 is K3, an update value nK1 of the node key K1 of node may be established as f(K3).

In this case, a server may encrypt the updated key of node 7 to transmit to members O and P corresponding to descendent nodes of node 15 since the members O and P do not know the updated key of node 7. In this case, the updated key of node 7 is encrypted to transmit to node 15. The members O and P which have received the key of node 7 may sequentially calculate the keys of the 1 and 3 using the one-way function.

Also, the server may encrypt the updated key of node 3 to transmit to members I, J, K, and L corresponding to descendents nodes of node 6 since the members I, J, K, and L do not know the updated key of node 3. In this case, the updated key of node 3 is encrypted to transmit to node 6. The members I, J, K, and L which have received the key of node 3 may calculate the key of node 1 using the one-way function.

Also, the server may encrypt an updated key of node 1 to transmit to members A through H corresponding to descendent nodes of node 2 since the members A through H do not know the updated key of node 1. In this case, the updated key of node 1 is encrypted to transmit to node 2

Consequently, according to a general aspect, when the method of updating a group is used, and when a number of a group member is N, a transmission quantity corresponds to approximately log 2N−1, and a storage quantity corresponds to approximately log 2N.

Figure 5:
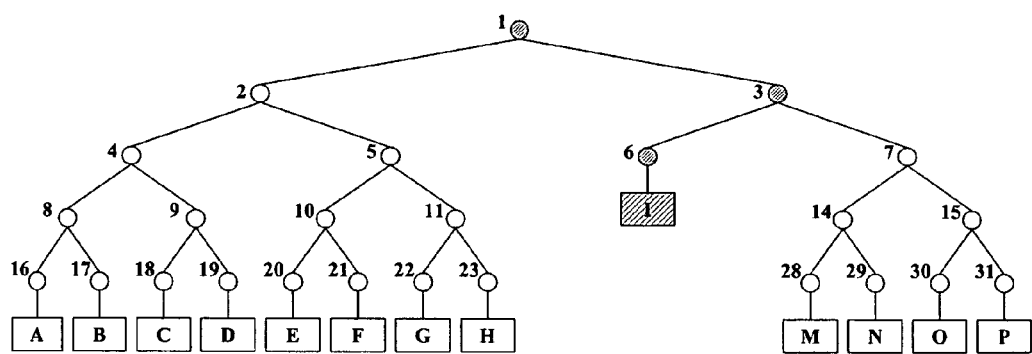
FIG. 5 is a diagram illustrating a binary tree corresponding to still another example of a group of another general aspect.

FIG. 5 is a diagram illustrating a binary tree corresponding to a still another example of a group according to another general aspect.

Referring to FIG. 5, a self-update path which connects node 3 and 1 is established when an existing member I leaves the group.

In this case, node 3 is established as an update start node, a node key update is performed along parent nodes, from node 3 to a root node.

Figure 6:
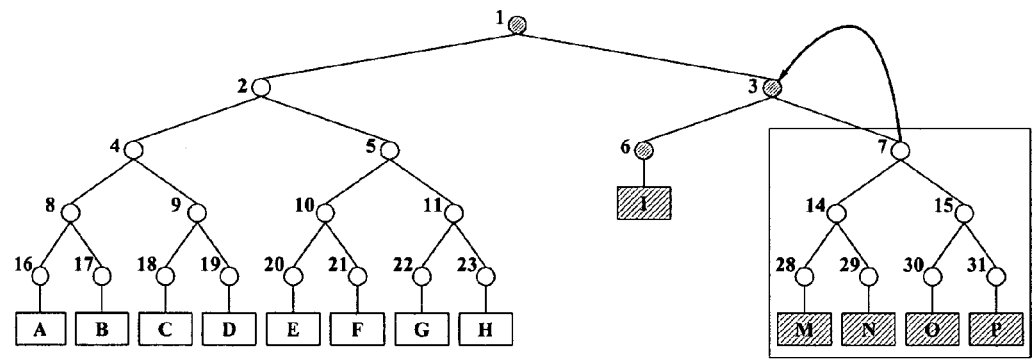
FIG. 6 is a diagram illustrating a change of the binary tree when an existing member leaves the group of FIG. 5.

FIG. 6 is a diagram illustrating a change of the binary tree when the existing member leaves the group of FIG. 5.

Referring to FIG. 6, node 3, that is a parent node of node 6 which corresponds to the member I, is replaced with node 7 when the existing member I leaves the group.

Namely, node 7, that is a child node of parent node 3, replaces the parent node 3 of node 6 which corresponds to the leaving member I.

Figure 7:
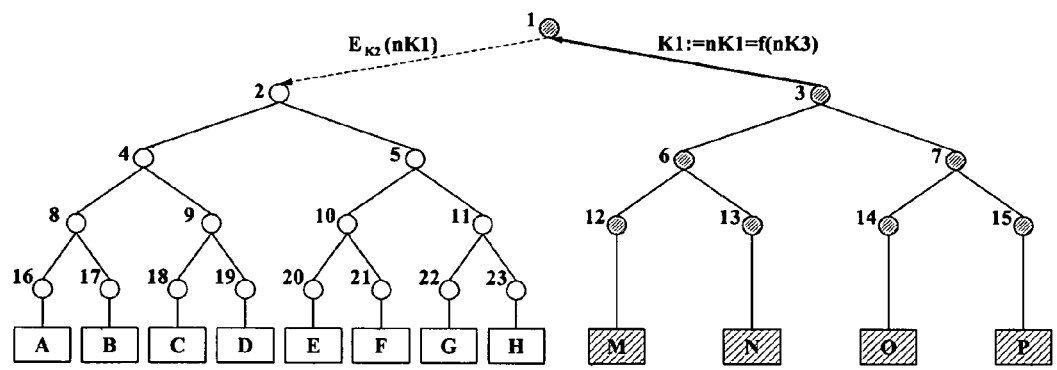
FIG. 7 is a diagram illustrating a binary tree corresponding to a result when the existing member leaves the group of FIG. 5.

FIG. 7 is a diagram illustrating the binary tree corresponding to a result when the existing member leaves the group of FIG. 5.

Referring to FIG. 7, a location of node 7 of FIG. 5 is changed to a location of node 3, a location of node 14 of FIG. 5 is changed to a location of node 6, a location of node 15 of FIG. 5 is changed to a location of node 7, a location of node 28 of FIG. 5 is changed to a location of node 12, a location of node 29 of FIG. 5 is changed to a location of node 13, a location of node 30 of FIG. 5 is changed to a location of node 14, and a location of node 31 of FIG. 5 is changed to a location of node 15.

In this case, a node key of node 3 is replaced as the node key before its change of node 7, a node key of node 6 is replaced as a node key before its change of node 14, the node key of node 7 is replaced as a node key before its change of node 15, a node key of node 12 is replaced as a node key before its change of node 28, a node key of node 13 is replaced as a node key before its change of node 29, a node key of node 14 is replaced as a node key before its change of node 30, and a node key of node 15 is replaced as a node key before its change of node 31.

When the node key of node 3, that is the update start node, is replaced as the node key before its change of node 7, the node key of node 1 is updated using the updated node key nK3 of node 3. Namely, an output of a one-way-function with respect to the updated node key nK3 of node 3 is updated as the node key of node 1.

In this case, members A through H corresponding to descendent nodes of node 2 are provided the node key of node 1 from a server. In this case, the updated node key of node 1 is encrypted to be transmitted to node 2.

As described above, a tree size of the binary tree which corresponds to the group may vary according to a number of members, or the free size may be fixed regardless of the number of the member. Namely, the binary tree which corresponds to the group may be a complete tree and fixed with its depth, and a leaf node of the complete binary tree may be divided into a subscribed node having a corresponding member and an unsubscribed node without the corresponding member.

In this case, assuming that the entire number of the members is N, the server configures a binary tree having a depth of log 2N, and each member is required to store log 2N key from the start.

Figure 8:
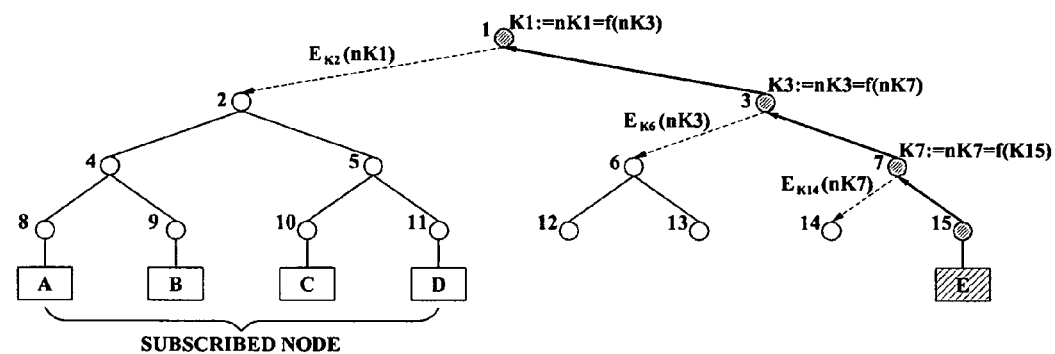
FIG. 8 is a diagram illustrating a group corresponding to an example of a fixed binary tree.

FIG. 8 is a diagram illustrating a group corresponding to an example of a fixed binary tree.

Referring to FIG. 8, nodes 8, 9, 10, and 11 respectively correspond to a joining node of members A, B, C, and D, nodes 12, 13, 14, and 15 correspond to disjoin nodes, and the member E newly joins to the group to be allocated to node 15.

In this case, node 15 is established as an update start node, and a node key of node 15 is established as a member key of the member E.

When the node key of node 15 is established, the node key of node 7 is updated using the node key of node 15. In this case, the node key of node 7 is established as an output of a one-way function with respect to the node key of node 15. As an example, assuming that the node key of node 15 is K15, an update value nK7 of the node key K7 of node 7 may be established as f(K15). In this case, f( ) indicates the one-way function.

Also, when the node key of node 7 is updated, a node key of node 3 is updated using the node key of node 7. In this case, the node key of node 3 may be established as an output of the one-way function with respect to the key of node 7. As an example, assuming that the node key of node 7 is K7, an update value nK3 of the node key K3 of node 3 may be established as f(K7).

Also, when the node key of node 3 is updated, a node key of node 1 is updated using the node key of node 3. In this case, the node key of node 1 may be established as an output of the one-way function with respect to the node key of node 3. As an example, assuming that the node key of node 3 is K3, an update value nK1 of the node key K1 of node 1 may be established as f(K3).

Consequently, as illustrated in FIG. 8, a self-update is performed along a path from node 15 through node 1, passing through nodes 7 and 3.

In this case, a server may not encrypt to transmit the node key of node 7 since there is no member corresponding to node 14.

Also, the server may not encrypt to transmit an updated key of node 3 since there is no member corresponding to a descendent node of node 6.

The server may encrypt an updated key of node 1 to transmit to the members A, B, C, and D corresponding to descendent nodes of node 2 since the members A, B, C, and D do not know an updated key of node 1.

Figure 9:
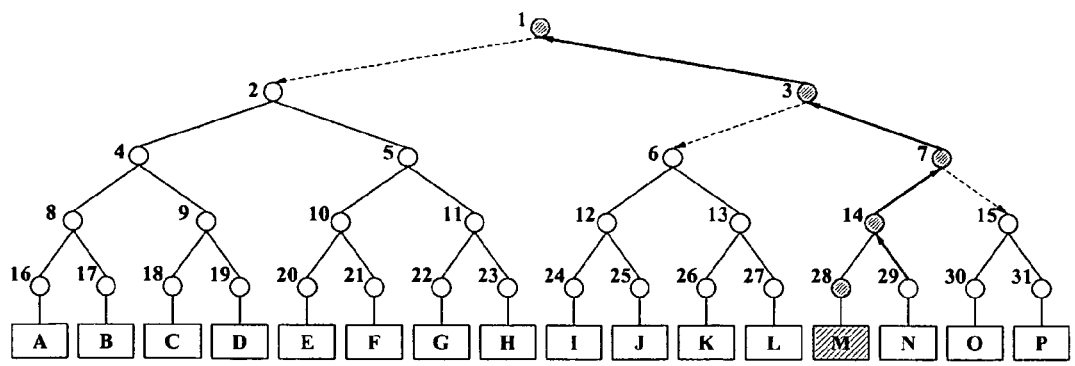
FIG. 9 is a diagram illustrating a group corresponding to another example of a fixed binary tree.

FIG. 9 is a diagram illustrating a group corresponding to another example of a fixed binary tree.

Referring to FIG. 9, node 14 is established as an update start node, and an update path is formed from node 14 to node 1, passing through nodes 7 and 3 when a member M leaves the group.

In this case, node 29 remains as a node corresponding to a member N.

When the member M leaves the group, node 28 becomes a disjoin node, and the update start node 14 is updated by a node key of node 29.

In this case, the node key of node 14 may be established as an output of a one-way function with respect to the node key of node 29.

A node key of node 7 is established as an output of the one-way function with respect to the node key of node 14, a node key of node 3 is established as an output of the one-way function with respect to the updated node key of node 7, and a node key of node 1 is established as an output of the one-way function with respect to the updated node key of node 3.

In this case, members O and P corresponding to descendent nodes of node 15 are provided the updated node key of node 7 from a server since the members O and P do not know the updated node key of node 7. In this case, the updated node key of node 7 is encrypted to be transmitted to node 15. The members O and P may sequentially calculate keys of nodes 3 and 1 using the transmitted node key of node 7.

In this case, members I, J, K, and L corresponding to descendents nodes of node 6 are provided the updated node key of node 3 since the members I, J, K, and L do not know the updated node key of node 3. In this case, the updated node key of node 3 is encrypted to be transmitted to node 6. The members I, J, K, and L may calculate the node key of node 1 using the transmitted node key of node 3.

In this case, members A through H corresponding to descendents nodes of node 2 are provided the updated node key of node 1 since the members A through H do not know the updated node key of node 1. In this case, the updated node key of node 1 is encrypted to be transmitted to node 2.

Figure 10:
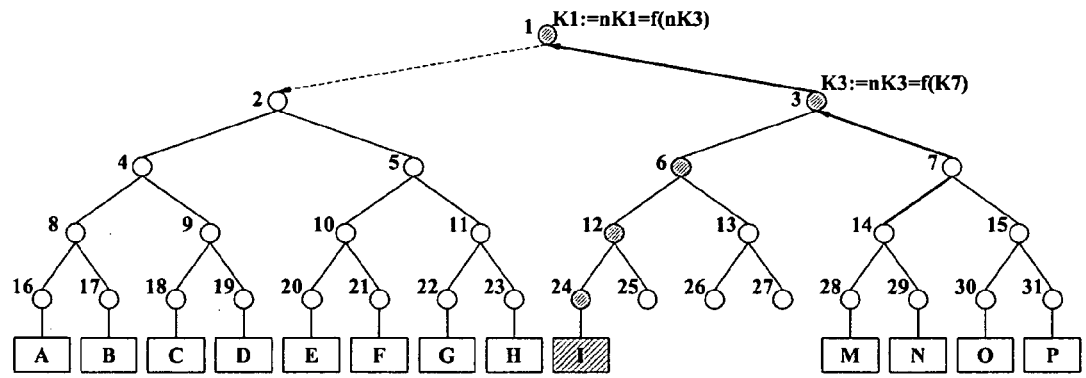
FIG. 10 is a diagram illustrating another group corresponding to another example of a fixed binary tree.

FIG. 10 is a diagram illustrating another group corresponding to another example of a fixed binary tree.

Referring to FIG. 10, node 3 is established as an update start node, and an update path is formed from node 3 to a node 1 when a member I leaves the group. Namely, node 3 is established as the update start node since node 3 is a node having a descendent node corresponding to a group member among ancestor nodes of the node which corresponds to the member I.

Node 24 becomes a disjoin node when the member I leaves the group, and the update start node 3 is updated by a node key of node 7.

In this case, the node key of node 3 may be established as an output of a one-way function with respect to the node key of node 7.

Also, a node key of node 1 may be established as an output of the one-way function with respect to the updated node key of node 3.

In this case, members A through H corresponding to descendents nodes of node 2 are provided an updated node key of node 1 since the members A through H do not know the updated node key of node 1. In this case, the updated node key of node 1 is encrypted to be transmitted to node 2.

In this case, keys with respect to nodes in a path from nodes 24 through 6 are managed to be updated in a server and the keys may be transmitted to a member joining the group when a corresponding node becomes a join node.

Figure 11:
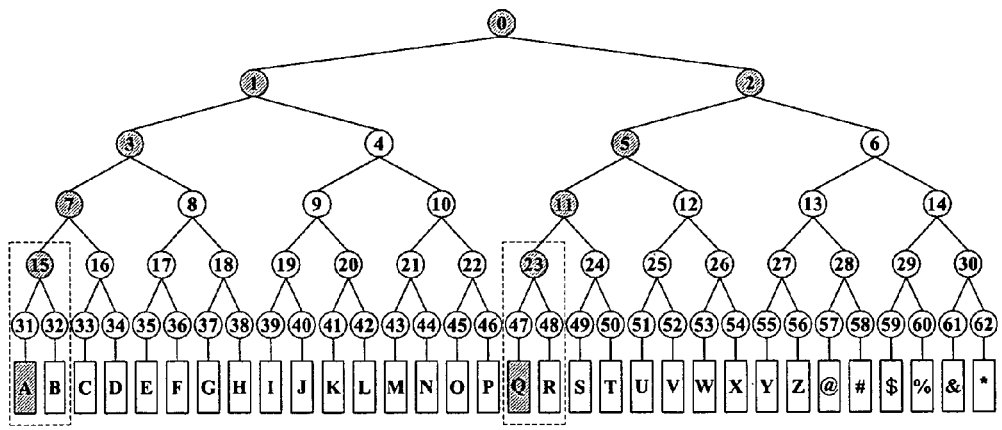
FIG. 11 is a diagram illustrating an example of a binary tree when multi-leave occurs.

FIG. 11 is a diagram illustrating an example of a binary tree when multi-leave occurs.

Referring to FIG. 11, node 15 becomes a sub-root node since node 15 is the highest node among ancestor nodes whose descendent leaf node members all leave except for one leaf node member, the leaf node 32 in the current example, from among descendant leaf nodes 31 and 32.

Similarly, node 23 becomes a sub-root node since node 23 is a highest node among ancestor nodes whose descendent leaf node members all leave, with the exception of one leaf node member, the ancestor node 48, from among leaf descendant nodes 47 and 48.

Figure 12:
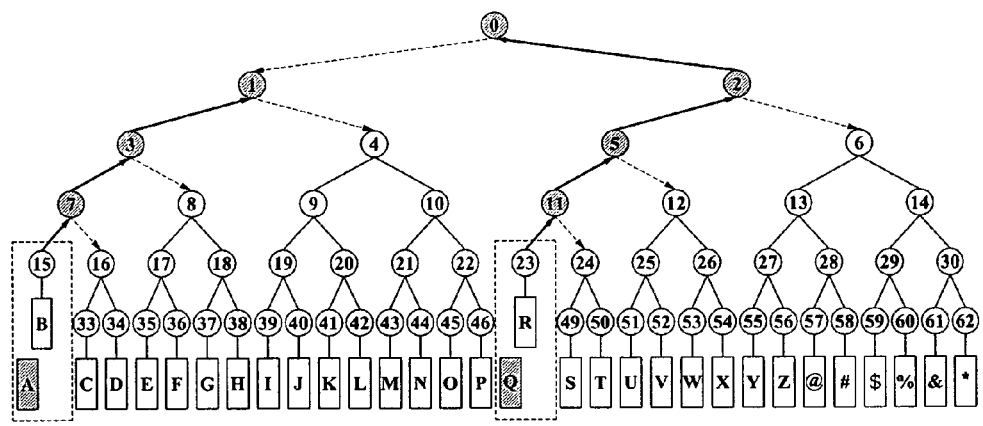
FIG. 12 is a diagram illustrating a change of the binary tree of FIG. 11.

FIG. 12 is a diagram illustrating a change of the binary tree of FIG. 11.

Referring to FIG. 12, as a result of member A leaving the group, a sub-root node 15 becomes a leaf node, and a member B becomes a member corresponding to sub-root node 15.

Similarly, as a result of member Q leaving, sub-root node 23 becomes a leaf node, and the member R becomes a member corresponding to sub-root node 23.

After the above node change is completed, a node key update is performed using the nodes, of which the leaving members A and Q have keys, as an update target node.

As illustrated in FIG. 12, nodes 0, 1, 2, 3, 5, 7, and 11 correspond to the update target node since the leaving member A has a key of nodes 7, 3, 1 and 0, and the leaving member Q has a key of nodes 11, 5, 2, and 0.

Further to the performing of the node key update, a node key of node 7 is updated using a node key of node 15. In this case, the node key of node 7 may be established as an output of a one-way function with respect to the node key of node 15. In this case, after the node key of node 7 is updated, the node key of node 15 may be a member key of member B. The node key of node 7 is encoded to be transmitted to members C and D, corresponding to descendent nodes of node 16.

After the node key of node 7 is updated, a node key of node 3 is updated using the updated node key of node 7. In this case, the node key of node 3 may be established as an output of a one-way function with respect to the node key of node 7. After the node key of node 3 is updated, the node key of node 3 is encoded to be transmitted to members E, F, G and H, corresponding to descendent nodes of node 8.

After the node key of node 3 is updated, a node key of node 1 is updated using the updated node key of node 3. In this case, the node key of node 1 may be established as an output of a one-way function with respect to the node key of node 3. After the node key of node 1 is updated, the node key of node 1 is encoded to be transmitted to members I through P, corresponding to descendent nodes of node 4.

Similarly, a node key of node 11 is updated using a node key of node 23. In this case, the node key of node 11 may be established as an output of a one-way function with respect to the node key of node 23. In this case, the node key of node 23 may be a member R. After the node key of the node 11 is updated, the node key of node 11 is encoded to be transmitted to members S and T, corresponding to descendent nodes of node 24.

After the node key of node 11 is updated, a node key of node 5 is updated using the updated node key of node 11. In this case, the node key of node 5 may be established as an output of a one-way function with respect to the node key of node 11. After the node key of node 5 is updated, the node key of node 5 is encoded to be transmitted to members U, V, W, and X, corresponding to descendent nodes of node 12.

After the node key of node 5 is updated, a node key of node 2 is updated using the updated node key of node 5. In this case, the node key of node 2 may be established as an output of a one-way function with respect to the node key of node 5. After the node key of node 2 is updated, the node key of node 2 is encoded to be transmitted to members Y through *, corresponding to descendent nodes of node 6.

The node 0 of an update use node establishes one of two child nodes 1 and 2, since both keys of the two child nodes 1 and 2 are updated.

For example, node 2 whose node identification number (ID) is greater than node 1 may be established as the update use node. After the update use node is established, a node key of node 0 is updated using a node key of the update use node.

The node key of node 0 is encoded to be transmitted to members C through P which corresponds to node 1, which is not established as the update use node. In this case, the node key of node 0 may be encoded using the node key of node 1.

Figure 13:
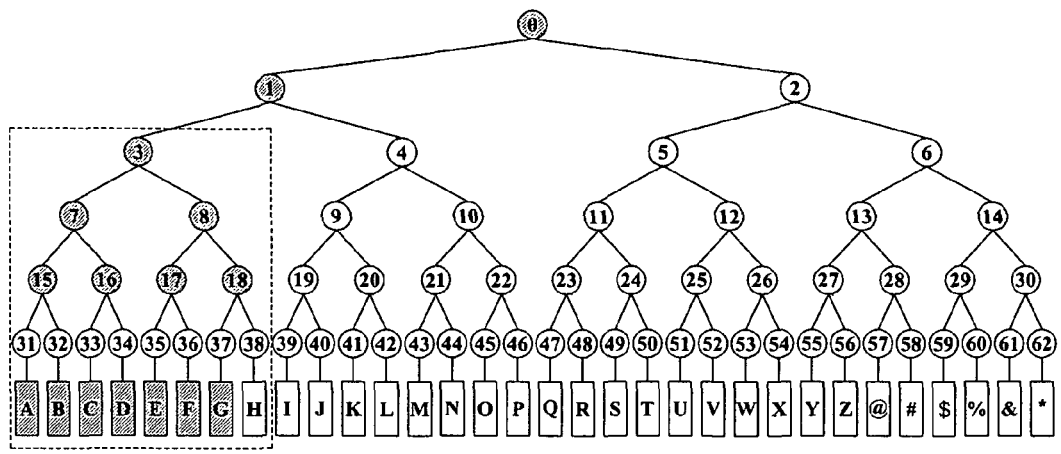
FIG. 13 is a diagram illustrating another example of the binary tree when multi-leave occurs.

FIG. 13 is a diagram illustrating another example of the binary tree when multi-leave occurs.

Referring to FIG. 13, it is illustrated that the group members A, B, C, D, E, F, and G simultaneously leave a group.

Node 3 becomes a sub-root node since node 3 is a highest node among ancestor nodes whose descendent leaf node members all leave, with the exception of one leaf node member, node 38 from among leaf nodes 31 through 38.

Figure 14:
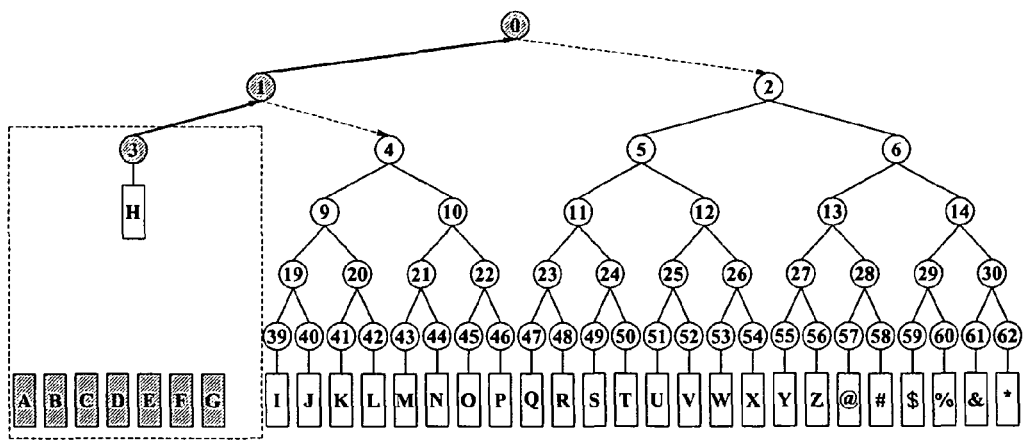
FIG. 14 is a diagram illustrating a change of the binary tree of FIG. 13.

FIG. 14 is a diagram illustrating a change of the binary tree of FIG. 13.

Referring to FIG. 14, as a result of group members A, B, C, D, E, F, and G leaving a group, sub-root node 3 becomes a leaf node, and a group member H becomes a member corresponding to sub-root node 3.

After the above node change is completed, the nodes, of which leaving members A, B, C, D, E, F, and G have keys, could correspond an update target node to a node key update.

As illustrated in FIG. 14, nodes 0 and 1 become the update target node since the leaving members A, B, C, D, E, F, and G have node keys of nodes 0 and 1.

A node key of node 1 is updated using a node key of node 3. In this case, the node key of node 1 may be established as an output of a one-way function with respect to the node key of node 3. In this case, the node key of node 3 may be a member of the member H. After the node key of node 1 is updated, the node key of node 1 is encoded to be transmitted to members I through P, corresponding to descendent nodes of node 4.

After the node key of node 1 is updated, the node key of node 0 is updated using the updated node key of node 1. In this case, the node key of node 0 may be established as an output of a one-way function with respect to the node key of node 1. After the node key of the node 0 is updated, the node key of node 0 is encoded to be transmitted to members Q through *, corresponding to descendent nodes of node 2. In this case, the node key of node 0 may be encoded using a node key of node 2.

Figure 15:
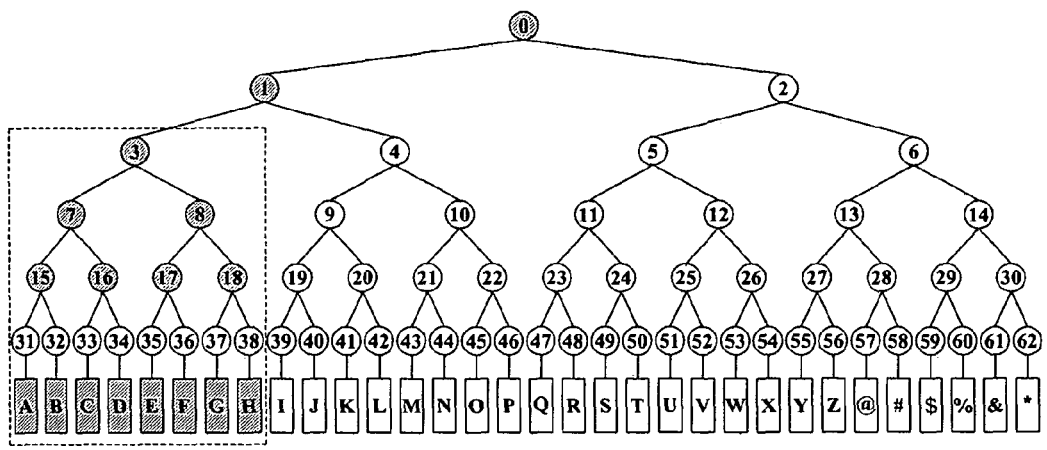
FIG. 15 is a diagram illustrating still another example of the binary tree when multi-leave occurs.

FIG. 15 is a diagram illustrating still another example of the binary tree when multi-leave occurs.

Referring to FIG. 15, members A through H simultaneously leave the group.

Node 3 becomes a sub-root node since node 3 is a highest node among ancestor nodes 3, 7, 8, 15, 16, 17, and 18 whose all descendent leaf node members leave.

Figure 16:
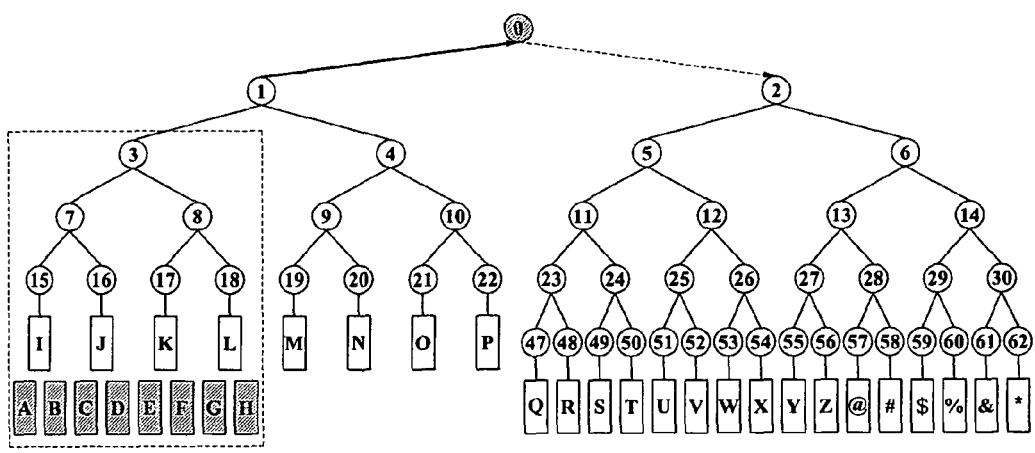
FIG. 16 is a diagram illustrating a change of the binary tree of FIG. 15.

FIG. 16 is a diagram illustrating a change of the binary tree of FIG. 15.

Referring to FIG. 16, as a result that members A through H leave the group, sub-root node 3 replaces parent node 1 of sub-root node 3 with sibling node 4 of sub-root node 3, and changes descendant nodes 9, 10, 19, 20, 21, 22, 39, 40, 41, 42, 43, 44, 45, and 46 to be descendant nodes 3, 4, 7, 8, 9, 10, 15, 16, 17, 18, 19, 20, 21, and 22 corresponding to parent node I of sub-root node 3 when the descendant nodes 9, 10, 19, 20, 21, 22, 39, 40, 41, 42, 43, 44, 45, and 46 of sibling node 4 exist. As an example, node 4 changes its node ID to a node ID of node 1 while maintaining its node key, and node 20 changes its node ID to a node ID of node 8 while maintaining its node key.

After the above node change is terminated, the leaving members A through H perform a node key update with respect to nodes having a key by using the nodes as an update target node.

As illustrated in FIG. 4, node 0 becomes the update target node since the leaving members A, B, C, D, E, F, G, and H have a node key of node 0.

The node key of node 0 is updated using the node key of node 1. In this case, the node key of node 0 may be established as an output of a one-way function with respect to the node key of node 1. In this case, the node key of node 1 may be the node key of node 4 before the node change. After the node key of node 0 is updated, the node key of node 0 is encoded to be transmitted to members Q through *, corresponding to descendent nodes of node 2.

Figure 17:
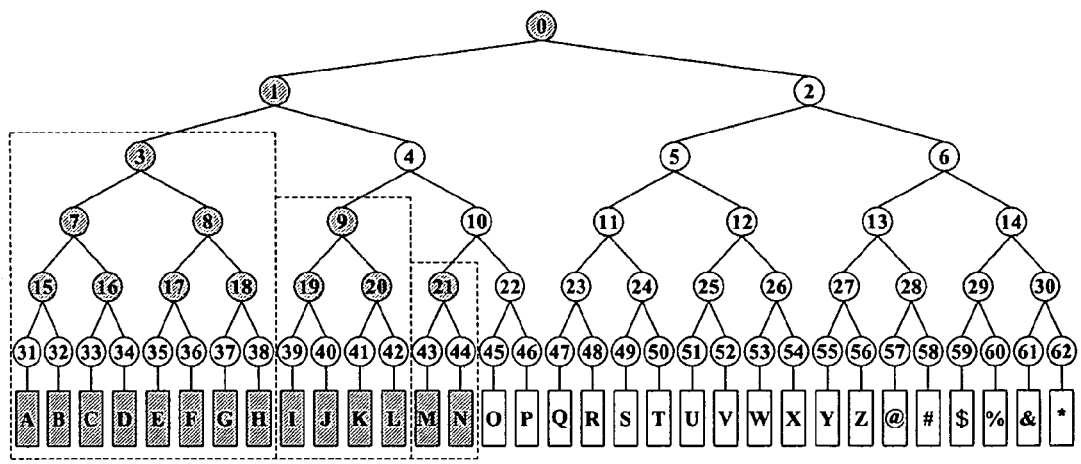
FIG. 17 is a diagram illustrating yet another example of the binary tree when multi-leave occurs.

FIG. 17 is a diagram illustrating yet another example of the binary tree when multi-leave occurs.

Referring to FIG. 17, members A through N simultaneously leave a group.

Nodes 21, 9, and 3 respectively become sub-root nodes since nodes 21, 9, and 3 are the highest nodes among ancestor nodes whose all descendent leaf node members leave.

Figure 18:
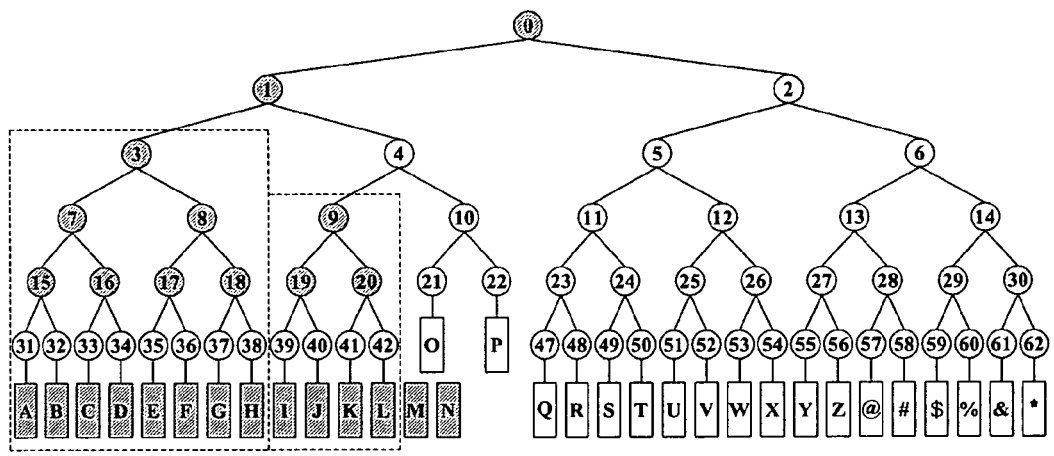
FIGS. 18 through 20 are diagrams illustrating a change of the binary tree of FIG. 17.
Figure 19:
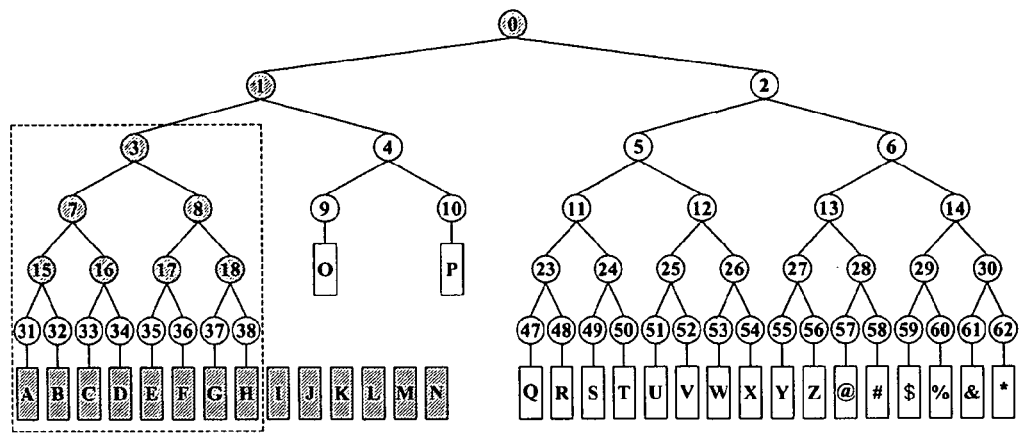
Figure 20:
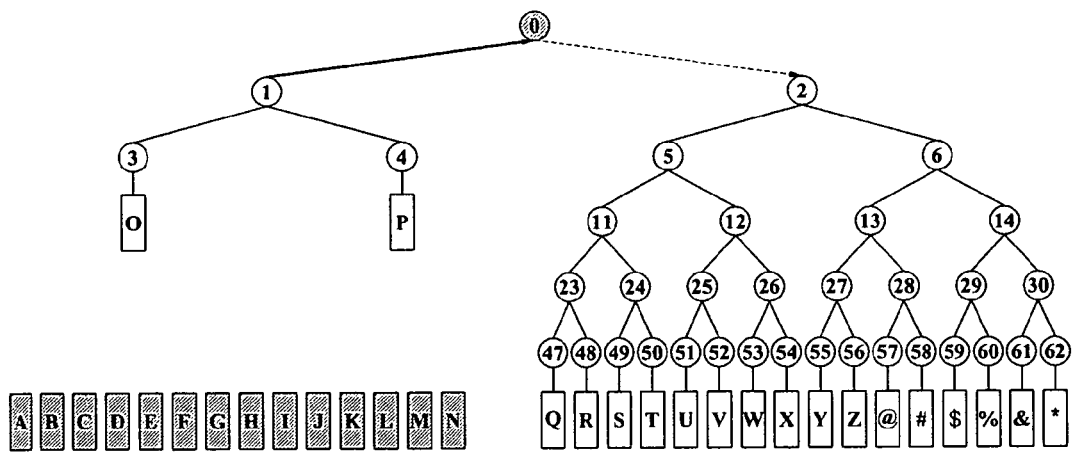

FIGS. 18 through 20 are diagrams illustrating a change of the binary tree of FIG. 17.

Referring to FIG. 18, as a result of members M through N leaving a group, sub-root node 21 replaces parent node 10 of sub-root node 21 with a sibling node 22 of sub-root node 21, and changes descendant nodes 45 and 46 to be descendant nodes 21, and 22 corresponding to the parent node 10 of sub-root node 21 when the descendant nodes 45, and 46 of sibling node 22 exist.

Referring to FIG. 19, as a result of members I through L leaving a group, a sub-root node 9 replaces a parent node 4 of the sub-root node 9 with a sibling node 10 of sub-root node 9, and changes the descendant nodes 21 and 22 to be descendant nodes 9 and 10 corresponding to parent node 4 of sub-root node 9 when the descendant nodes 21 and 22 of the sibling node 10 exist.

Referring to FIG. 20, as a result of members A through H leaving a group, a sub-root node 3 replaces a parent node 1 of sub-root node 3 with a sibling node 4 of sub-root node 3, and changes the descendant nodes 9 and 10 to be descendant nodes 3 and 4 corresponding to the parent node 1 of sub-root node 3 when the descendant nodes 9 and 10 of sibling node 4 exist.

After the node changes of FIGS. 18 through 20 are completed, the leaving members A through N perform a node key update with respect to nodes having a key by using the nodes as an update target node.

As illustrated in FIG. 20, a node 0 becomes an update target node since the leaving members A through H have a node key of the node 0.

The node key of node 0 is updated using the node key of node 1. In this case, the node key of node 0 may be established as an output of a one-way function with respect to the node key of node 1. In this case, the node key of node 1 may be the node key of node 4 before the node change. After the node key of node 0 is updated, the node key of node 0 is encoded to be transmitted to members Q through *, corresponding to descendent nodes of node 2.

Figure 21:
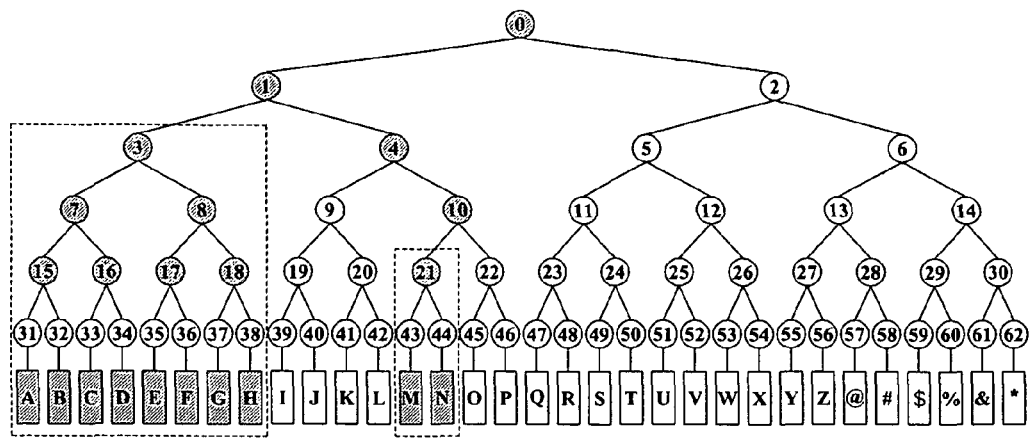
FIG. 21 is a diagram illustrating a further example of the binary tree when multi-leave occurs.

FIG. 21 is a diagram illustrating a further example of the binary tree when multi-leave occurs.

Referring to FIG. 21, members A through H, and M through N simultaneously leave a group.

Nodes 21, and 3 respectively become sub-root nodes since nodes 21 and 3 are highest nodes among ancestor nodes whose all descendent leaf node members leave.

Figure 22:
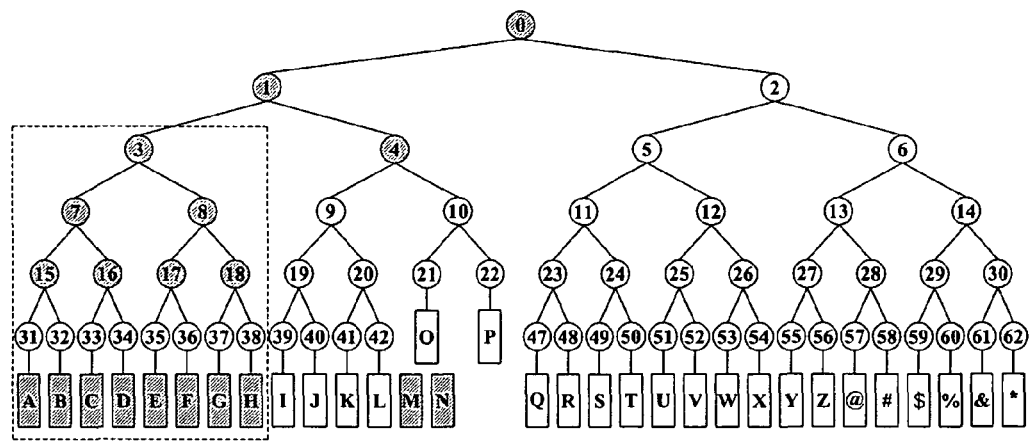
FIGS. 22 through 23 are diagrams illustrating a change of the binary tree of FIG. 21.
Figure 23:
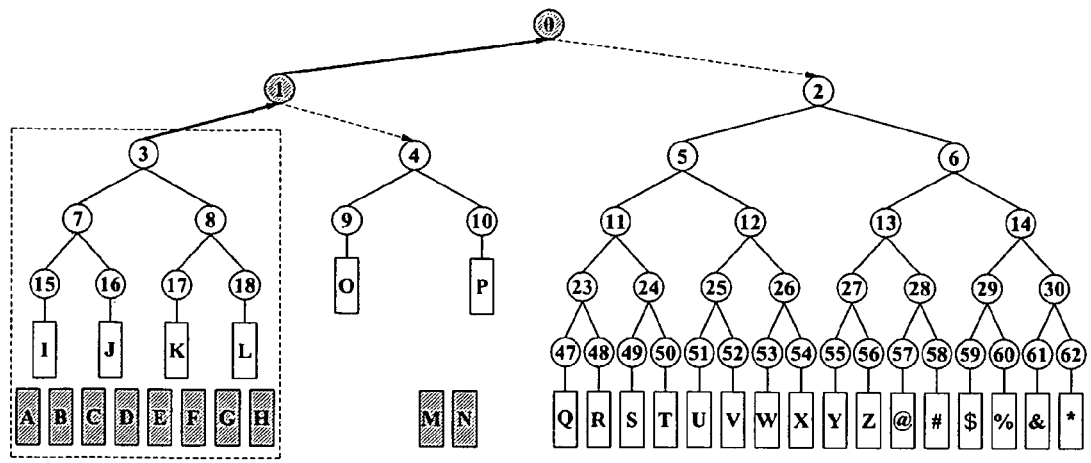

FIGS. 22 through 23 are diagrams illustrating a change of the binary tree of FIG. 21.

Referring to FIG. 22, as a result of members M through N leaving a group, a sub-root node 21 replaces a parent node 10 of sub-root node 21 with a sibling node 22 of sub-root node 21, and changes descendant nodes 45 and 46 to be descendant nodes 21, and 22 corresponding to the parent node 10 of sub-root node 21 when the descendant nodes 45 and 46 of the sibling node 22 exist.

Referring to FIG. 23, as a result of members A through H leaving a group, a sub-root node 3 replaces a parent node 1 of sub-root node 3 with a sibling node 4 of sub-root node 3, and changes the descendant nodes 9, 10, 19, 20, 21, 22, 39, 40, 41 and 42 to be descendant nodes 3, 4, 7, 8, 9, 10, 15, 16, 17, and 18 corresponding to parent node 1 of sub-root node 3 when the descendant nodes 9, 10, 19, 20, 21, 22, 39, 40, 41 and 42 of the sibling node 4 exist.

After the node changes in FIGS. 22 through 23 are completed, the leaving members, A through H and M through N, perform a node key update with respect to nodes having a key by using the nodes as an update target node.

As illustrated in FIG. 23, nodes 0 and 1 become update target nodes since the leaving members H, M, and N have node keys of nodes 0 and 1.

The node key of node 1 is updated using a node key of node 3. In this case, the node key of node I may be established as an output of a one-way function with respect to the node key of node 3. In this case, the node key of node 3 may be a node key of node 9 before the node change. After the node key of node 1 is updated, the node key of node 1 is encoded to be transmitted to members O and P, corresponding to descendent nodes of node 4.

After the node key of node 1 is updated, the node key of node 0 is updated using the updated node key of node 1. In this case, the node key of node 0 may be established as an output of a one-way function with respect to the node key of node 1. After the node key of node 0 is updated, the node key of node 0 is encoded to be transmitted to members Q through '*', corresponding to descendent nodes of node 2.

Figure 24:
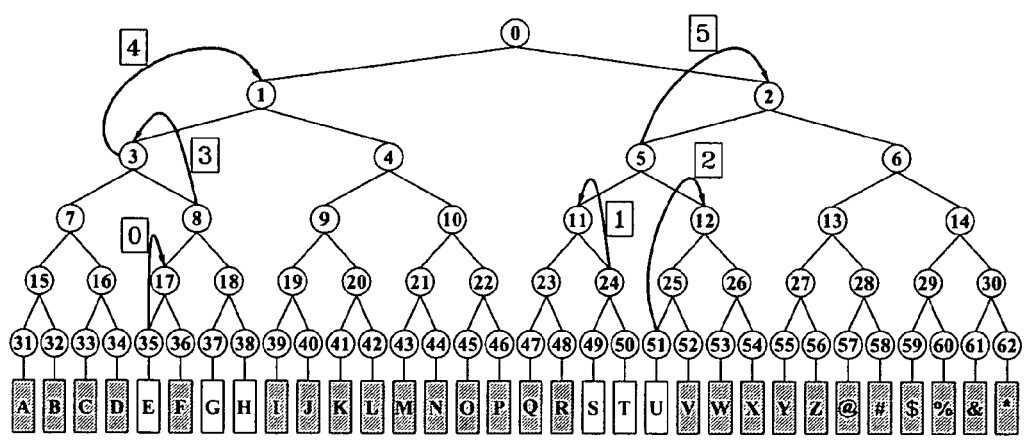
FIG. 24 is a diagram illustrating a further example of the binary tree when multi-leave occurs.

FIG. 24 is a diagram illustrating a further example of the binary tree when multi-leave occurs.

Referring to FIG. 24, members A through D, F, I through R, and V through * simultaneously leave a group.

Node 17 becomes a sub-root node since node 17 is the highest node among ancestor nodes whose descendent leaf nodes 35 and 36 all leave, with the exception of one descendent leaf node 35 in the current example.

Node 23 becomes a sub-root node since node 23 is a highest node among ancestor nodes whose all descendent leaf nodes leave.

Node 7 becomes a sub-root node since node 7 is a highest node among ancestor nodes whose all descendent leaf nodes leave.

Node 12 becomes a sub-root node since node 12 is a highest node among ancestor nodes whose descendent leaf nodes all leave, with the exception of one leaf node.

Node 4 becomes a sub-root node since node 4 is a highest node among ancestor nodes whose all descendent leaf nodes leave.

Node 6 becomes a sub-root node since node 6 is a highest node among ancestor nodes whose all descendent leaf nodes leave.

The node change is performed in a direction from lower nodes to higher nodes as illustrated in FIG. 24.

Figure 25:
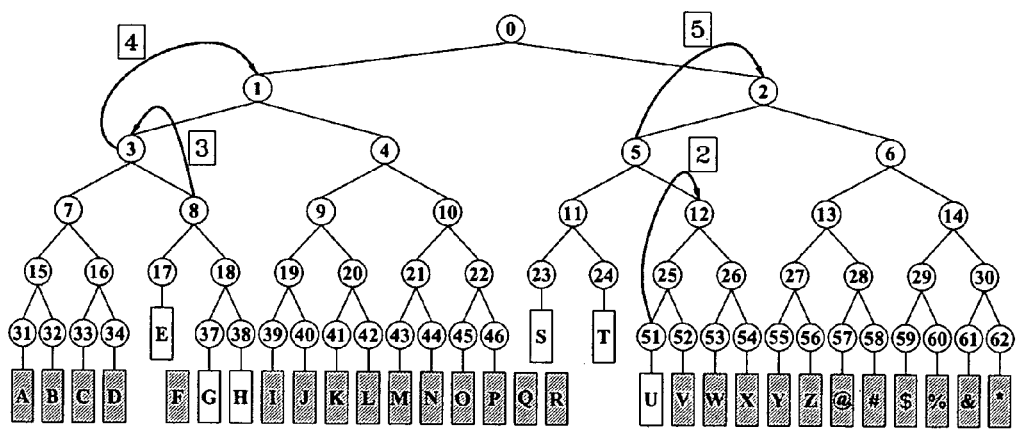
FIGS. 25 through 27 are diagrams illustrating a change of the binary tree of FIG. 24.
Figure 26:
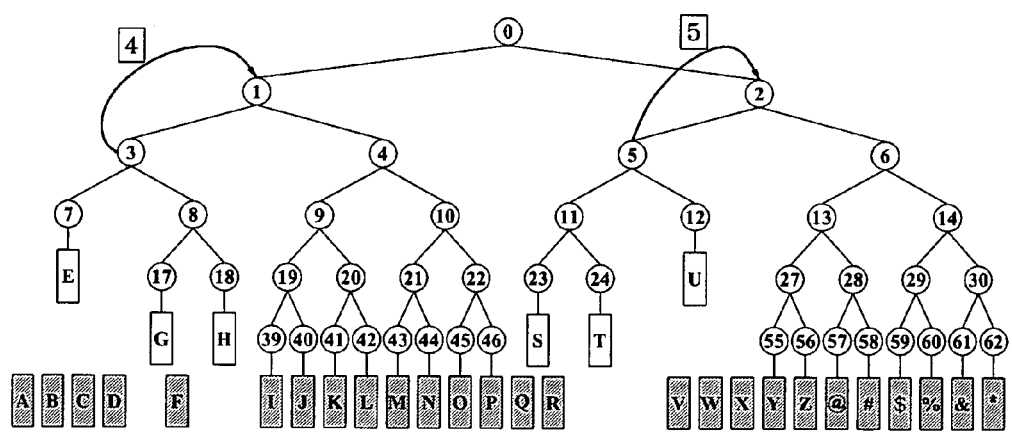
Figure 27:
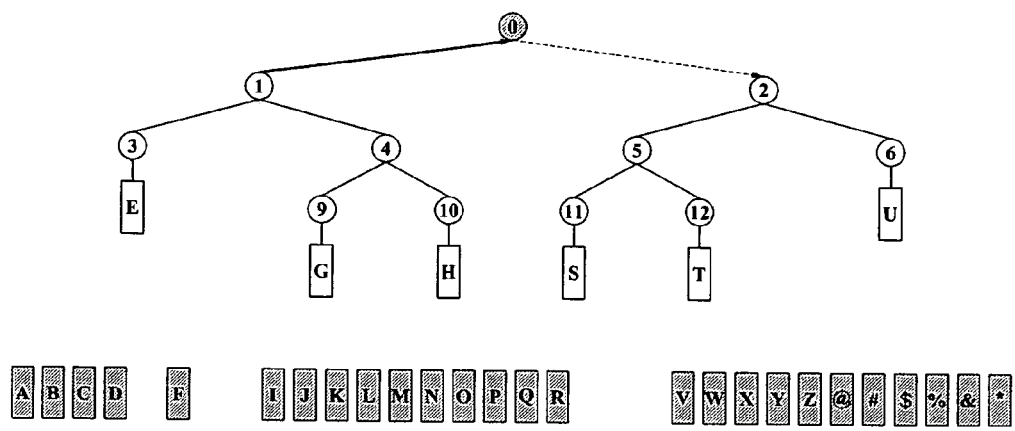

FIGS. 25 through 27 are diagrams illustrating a change of the binary tree of FIG. 24.

Referring to FIG. 25, as a result of group member F leaving a group, sub-root node 17 becomes a leaf node, and group member E becomes a member corresponding to sub-root node 17.

Also, members Q and R leave the group, a parent node 11 of a sub-root node 23 is replaced with a sibling node 24 of sub-root node 23, and descendent nodes 23 and 24 corresponding to parent node 11 are replaced with descendent nodes 49 and 50 when descendent nodes 49 and 50 of sibling node 24 exist.

Referring to FIG. 26, members V, W, and X leave a group after the node change illustrated in FIG. 25 is performed, a sub-root node 12 becomes a leaf node, and a member U becomes a member corresponding to sub-root node 12.

Later, members A, B, C, and D leave the group, a parent node 3 of a sub-root node 7 is replaced with a sibling node 8 of sub-root node 7, and descendent nodes 7, 8, 17 and 18 corresponding to parent node 3 are replaced with descendent nodes 17, 18, 37 and 38 when descendent nodes 17, 18, 37 and 38 of sibling node 8 exist.

Referring to FIG. 27, members I through P leave a group after the node change illustrated in FIG. 26 is performed, a parent node 1 of a sub-root node 4 is replaced with a sibling node 3 of sub-root node 4, and descendent nodes 3, 4, 9, and 10 corresponding to parent node 1 are replaced with descendent nodes 7, 8, 17 and 18 of sibling node 3.

Later, as a result of members Y through '*' leaving the group, a parent node 2 of a sub-root node 6 is replaced with a sibling node 5 of the sub-root node, and descendent nodes 5, 6, 11, and 12 of parent node 2 are replaced with descendent nodes 11, 12, 23, and 34 of sibling node 5.

After the node change in FIGS. 25 through 27 are completed, the leaving members perform a node key update with respect to nodes having a key by using the nodes as an update target node.

As illustrated in FIG. 27, Node 0 becomes an update target node since the leaving members have a node key of node 0.

The node key of node 0 is updated using the node key of node 1. In this case, the node key of node 0 may be established as an output of a one-way function with respect to the node key of node 1. In this case, the node key of node I may be a node key of node 3 before node change. After the node key of node 0 is updated, the node key of node 0 is encoded to be transmitted to members S, T, and U, corresponding to descendent nodes of node 2.

Figure 28:
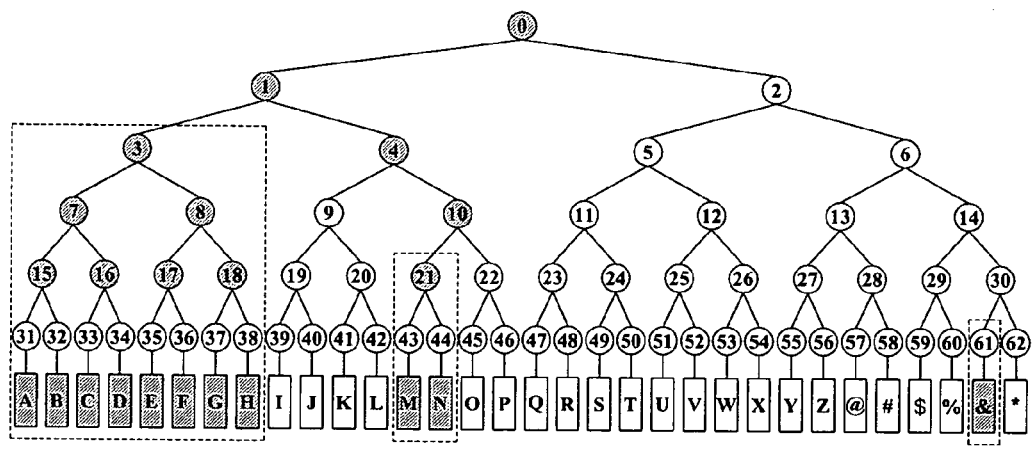
FIG. 28 is a diagram illustrating a further example of a fixed binary tree when a multi-leave occurs.

FIG. 28 is a diagram illustrating an example of a fixed binary tree when multi-leave occurs.

Referring to FIG. 28, members A through H, M, N, and '&' simultaneously leave a group.

When the multi-leave occurs in a group that corresponds to the fixed binary tree, the leaving members perform only a key update with respect to nodes having a key by using the nodes as an update target node, instead of performing a node change.

Figure 29:
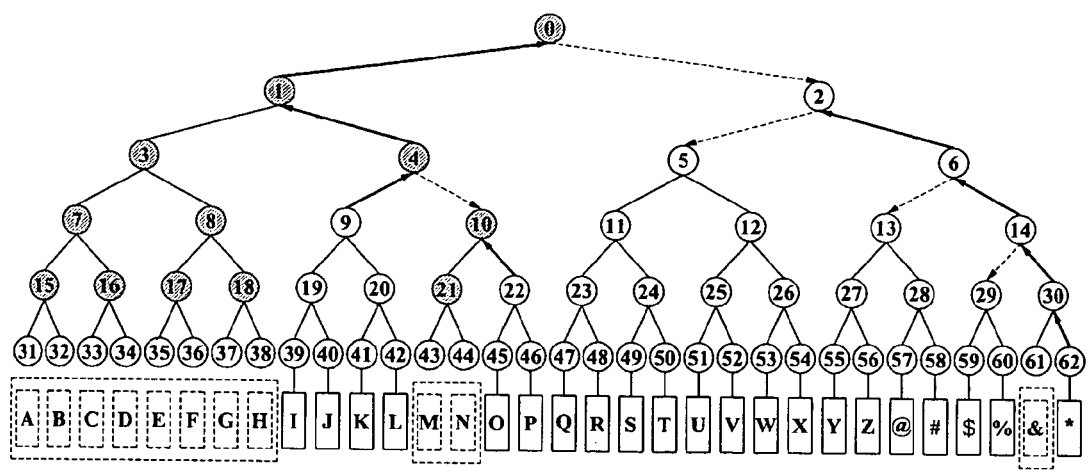
FIG. 29 is a diagram illustrating a node key update of the binary tree of FIG. 28.

FIG. 29 is a diagram illustrating a node key update of the binary tree of FIG. 28.

Referring to FIG. 29, nodes 0, 1, 2, 4, 6, 10, 14, and 30 become update target nodes since leaving member '&' has keys of nodes 30, 14, 6, 2, and 0, leaving members M and N have keys of nodes 10, 4, 1, and 0, and leaving members A through H have keys of nodes 1 and 0.

Operation of a node key update with respect to an update target node is the same as the aforementioned description.

Figure 30:
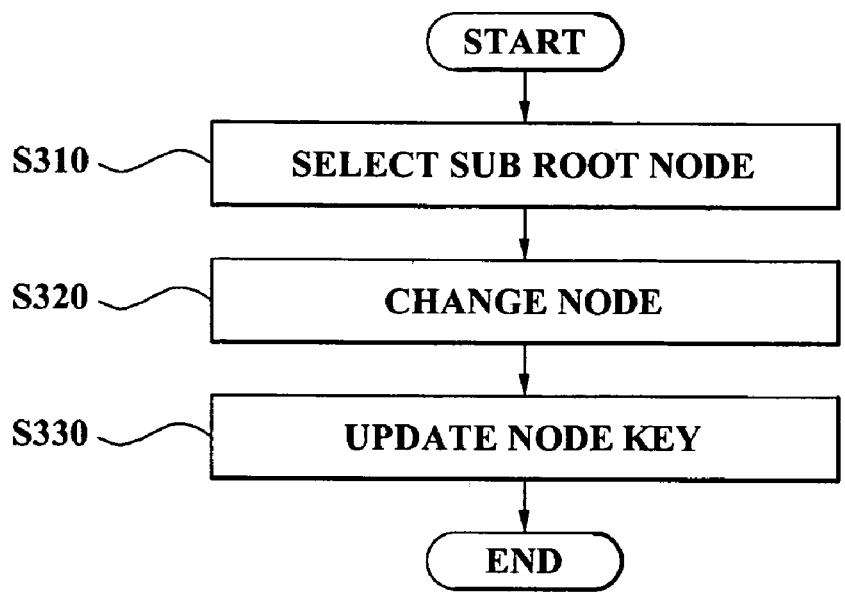
FIG. 30 is a flowchart illustrating a group key update method according to a general aspect.

FIG. 30 is a flowchart illustrating a group key update method according to a general aspect.

Referring to FIG. 30, in operation S310, the group key update method with respect to multi-leave of a group corresponding to a binary tree according to a general aspect selects a sub-root node among nodes on the binary tree.

In this case, the sub-root node may be any one of a highest level node among ancestor nodes whose all descendent leaf node members leave, and a highest level node among the ancestor nodes whose descendent leaf node members all leave, with the exception of one leaf node member.

Also, in operation S320, the group key update method according to a general aspect performs a node change with respect to the group according to a type of the sub-root node, and generates a changed binary tree.

In this case, operation S320 may perform the node change corresponding to a lower level node prior to a higher level node.

Herein, operation S320 may replace a parent node of the sub-root node with a sibling node of the sub-root node when the sub-root node is the highest level node among ancestor nodes whose all descendent leaf node members leave, and changes the descendant nodes to be a descendant node corresponding to the parent node of the sub-root node when a descendant node of the sibling node exists.

Herein, operation S320 may change the sub-root node to be the leaf node, and change a member corresponding to the one leaf node to be a member corresponding to the sub-root node when the sub-root node is a top node of ancestor nodes whose descendent leaf node members all leave, with the exception of one leaf node.

Also, in operation S330, the group key update method according to a general aspect performs a node key update with respect to the changed binary tree.

In this case, operation S330 may include selecting an update target node among the nodes on the changed binary tree, and updating a key of the update target node by updating a key of the parent node of the node corresponding to an updated key, using the updated key. Herein, the updating of the key of the update target node may include establishing one of two child nodes of the parent node of the node corresponding to the updated key as an update use node when both keys of the two child nodes are updated, and updating the key of the parent node using the update use node. Herein, the updating of the key of the parent node may establish an output of a one-way function with respect to the key of the update use node as the key of the parent node. Herein, the establishing of the one of the two child nodes may establish the one of the two child nodes as the update use node after comparing node IDs of the two child nodes.

Herein, the performing of the node key update may further include encoding the key of the parent node to transmit the encoded key to a group member, corresponding to a node other than the update use node among the two child nodes, in correspondence to the node other than the update use node.

Figure 31:
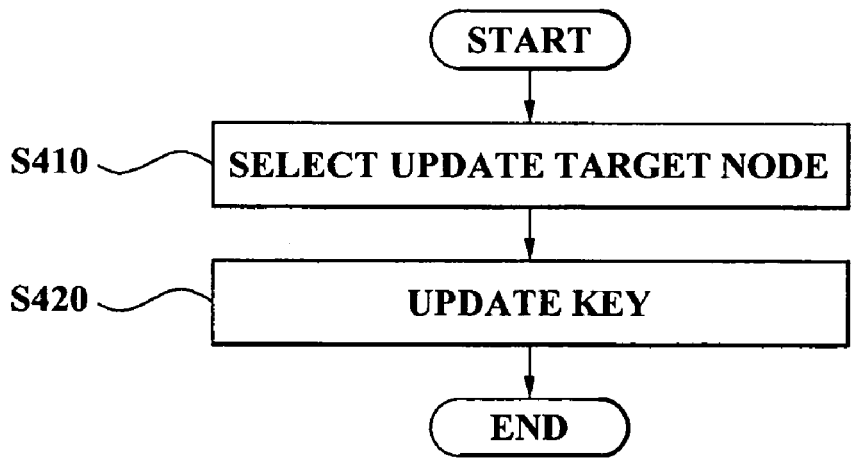
FIG. 31 is a flowchart illustrating a group key update method with respect to a binary tree having a fixed tree structure according to a general aspect.

FIG. 31 is a flowchart illustrating a group key update method with respect to a binary tree having a fixed tree structure according to an embodiment of the present invention.

Referring to FIG. 31, in operation S410, the group key update method with respect to a binary tree having a fixed tree structure according to an embodiment of the present invention selects an update target node corresponding to the multi-leave among nodes on the binary tree.

Also, in operation S420, the group key update method with respect to a binary tree having a fixed tree structure according to an embodiment of the present invention updates a key of the update target node by updating a key of the parent node of the node corresponding to an updated key, using an updated key.

In this case, operation S420 may include establishing one of two child nodes of the parent node of the node, corresponding to the updated key, as an update use node when both keys of the two child nodes are updated, and updating the key of the parent node using the update use node.

Herein, the group key update method may further include encoding the key of the parent node to transmit the encoded key to a group member, corresponding to a node other than the update use node among the two child nodes, in correspondence to the node other than the update use node. In this case, the transmitting of the key of the parent node to the group member may transmit the key of the parent node to the key of the node other than the update use node.

The group key update method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 32:
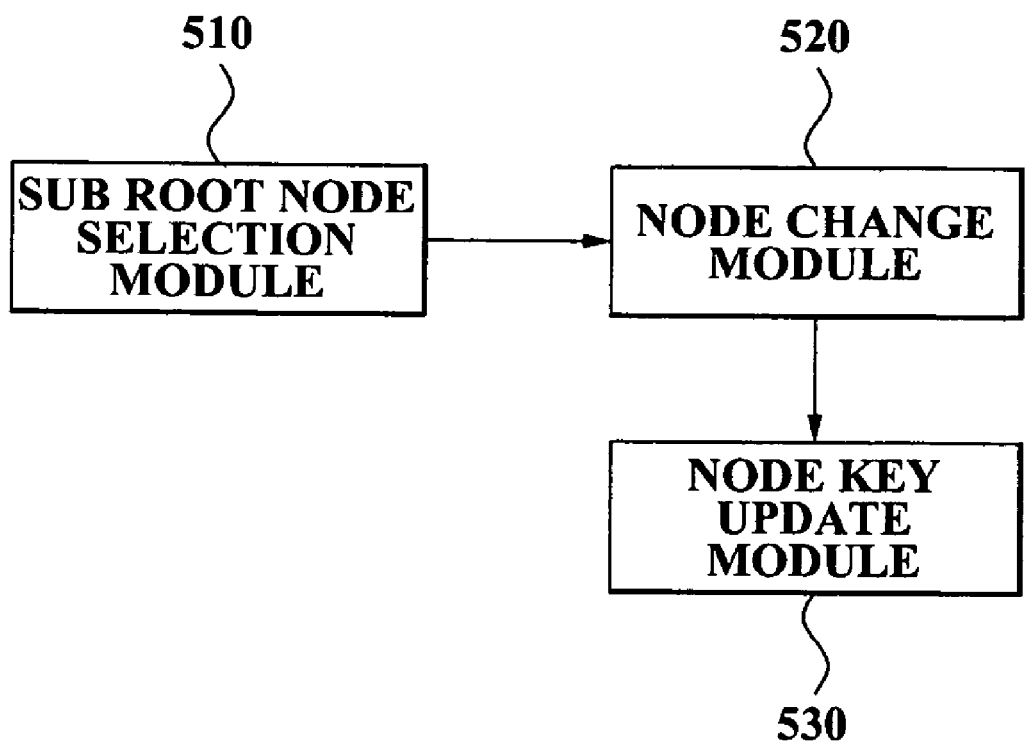
FIG. 32 is a block diagram illustrating a group key update apparatus according to a general aspect.

FIG. 32 is a block diagram illustrating a group key update apparatus according to a general aspect.

Referring to FIG. 32, the group key update apparatus according to the embodiment of the present invention includes a sub-root node selection module 510, a node change module 520, and a node key update module 530.

The sub-root node selection module 510 selects a sub-root node among nodes on a binary tree.

The node change module 520 performs a node change with respect to a group according to a type of the sub-root node, and generates a changed binary tree.

In this case, the node change module 520 replaces a parent node of the sub-root node with a sibling node of the sub-root node when the sub-root node is the highest level node among ancestor nodes whose all descendent leaf node members leave, and changes the descendant nodes to be a descendant node corresponding to the parent node of the sub-root node when a descendant node of the sibling node exists.

Also, when the sub-root node is a top node of ancestor nodes whose leaf node members all leave, with the exception of one leaf node corresponding to descendant nodes, the node change module 520 changes the sub-root node to be the leaf node, and changes a member corresponding to the one leaf node to be a member corresponding to the sub-root node.

The node key update module 530 performs a node key update with respect to the changed binary tree. Further descriptions regarding the node key update apparatus that is not described in the specification will be omitted since further descriptions are the same as the description of FIG. 30.

According to a general aspect, a group key update method and a group key update apparatus can effectively perform a self update.

Also, according to a general aspect, a group key update method and a group key update apparatus can effectively provide members incapable of performing a self update with a necessary key.

Also, according to a general aspect, a group key update method and a group key update apparatus can effectively select a node that is necessary for a self update, and perform a key update with respect to the selected node.

Also, according to a general aspect, a group key update method and a group key update apparatus can effectively perform a change of a tree structure depending on multi-leave by using a sub-root node.

While certain general aspects of the invention have been shown and described herein with reference to certain aspects thereof, it will be understood by those skilled in the art that various changes in form and details may be made therein without departing from the spirit and scope of the invention as defined by the appended claims and their equivalents.

What is claimed is:

1. A group key update method with respect to multi-leave of a group corresponding to a binary tree, the method comprising:
   selecting a sub-root node corresponding to the multi-leaving group, among nodes on the binary tree;
   generating a changed binary tree, the generating of the changed binary tree comprising performing a node change with respect to the multi-leaving group according to a type of the sub-root node; and
   performing a node key update for the changed binary tree by establishing a self-update path from the sub-root node to a root node of the binary tree, wherein a node key of each node along the self-update path is self-updated using a node key of a respective child node,
   wherein at least one of the selecting of the sub-root node, the generating of the changed binary tree, and the performing of the node key update is performed by hardware or a combination of hardware and software.

2. The method of claim 1, wherein the sub-root node includes any one of a highest level node among ancestor nodes whose descendent leaf node members all leave, and a highest level node among ancestor nodes whose descendent leaf node members all leave with an exception of one leaf node member.

3. The method of claim 1, wherein the generating of the changed binary tree further comprises performing the node change corresponding to a lower level node prior to a higher level node.

4. The method of claim 3, wherein the generating of the changed binary tree further comprises:
   replacing a parent node of the sub-root node with a sibling node of the sub-root node when the sub-root node is a highest level node among ancestor nodes whose descendent leaf node members all leave; and when a descendant node of the sibling node exists, changing the descendant node of the sibling node to be a descendant node corresponding to the replacing of the parent node with the sibling node.

5. The method of claim 3, wherein, when the sub-root node is a top node of ancestor nodes whose descendent leaf node members all leave with an exception of one leaf node member, the generating of the changed binary tree further comprises:

changing the sub-root node to be the leaf node; and
changing a member corresponding to the one leaf node to be a member corresponding to the leaf node that was changed from being the sub-root node.

6. The method of claim 1, wherein the performing of the node key update comprises:

selecting an update target node among nodes on the changed binary tree; and
updating a key of the update target node, the updating of the key of the update target node comprising:
updating a key of a parent node of a node corresponding to the updated key, using the updated key;
establishing one of two child nodes of the parent node of the node corresponding to the updated key as an update use node when keys of the two child nodes are updated; and
comparing node identification numbers (IDs) of the two child nodes prior to the establishing of the one of the two child nodes as the update use node.

7. The method of claim 6, wherein the updating of the key of the update target node further comprises updating the key of the parent node using the update use node.

8. The method of claim 7, wherein the performing of the node key update further comprises:

encoding the key of the parent node; and
transmitting the encoded key to a group member corresponding to a node other than the update use node from among the two child nodes, in correspondence to the node other than the update use node.

9. The method of claim 8, wherein the transmitting of the encoded key further comprises transmitting the encoded key of the parent node to a key of the node other than the update use node.

10. The method of claim 8, wherein the updating of the key of the parent node comprises establishing an output of a one-way function with respect to the key of the update use node as the key of the parent node.

11. The method of claim 10, wherein the one-way function is configured to receive the key of the update use node and update information.

12. A group key update method with respect to multi-leave of a group corresponding to a binary tree, the method comprising:

updating a key of a first child node based on a first member group of the multi-leave leaving the binary tree;
updating a key of a second child node based on a second member group of the multi-leave leaving the binary tree;
determining one of the first child node and the second child node as an update use node; and
updating a key of a parent node of the first child node and the second child node, based on a key of the determined update use node,
wherein at least one of the updating the key of the first child node, the updating the key of the second child node, the selecting of the key, and the updating the key of the parent node is performed by hardware or a combination of hardware and software.

13. The method of claim 12, wherein the updating of the key of the update target node further comprises comparing node identification numbers (IDs) of the two child nodes prior to the establishing of the one of the two child nodes as the update use node.

14. The method of claim 13, further comprising:

encoding the key of the parent node; and
transmitting the encoded key to a group member corresponding to the child node other than the update use node from among the two child nodes, in correspondence to the node other that the update use node.

15. The method of claim 14, wherein the transmitting of the encoded key further comprises transmitting the encoded key of the parent node to a key of the child node other than the update use node.

16. The method of claim 13, wherein the updating of the key of the parent node comprises establishing an output of a one-way function with respect to the key of the update use node as the key of the parent node.

17. A non-transitory computer-readable storage medium storing a program to implement a group key update method with respect to multi-leave of a group corresponding to a binary tree, the program comprising:

a first set of instructions for selecting a sub-root node corresponding to the multi-leaving group among nodes on the binary tree;
a second set of instructions for generating a changed binary tree by performing a node change with respect to the multi-leaving group according to a type of the sub-root node; and
a third set of instructions for performing a node key update with respect to the changed binary tree by establishing a self-update path from the sub-root node to a root node of the binary tree, wherein a node key of each node along the self-update path is self-updated using a node key of a respective child node.

18. A group key update apparatus of a member with respect to multi-leave of a group corresponding to a binary tree, the apparatus comprising:

a sub-root node selection module configured to select a sub-root node corresponding to the multi-leaving group among nodes on the binary tree;
a node change module configured to generate a changed binary tree and perform a node change with respect to the multi-leaving group according to a type of the sub-root node; and
a node key update module configured to perform a node key update with respect to the changed binary tree by establishing a self-update path from the sub-root node to a root node of the binary tree,
wherein a node key of each node along the self-update path is self-updated using a node key of a respective child node, and
wherein the group key update apparatus comprises a processor to execute each of the sub-root node selection module, the node change module, and the node key update module.

19. The apparatus of claim 18, wherein the sub-root node comprises any one of:

a highest level node among ancestor nodes whose descendent leaf node members all leave; and
a highest level node among ancestor nodes whose descendent leaf node members all leave with an exception of one leaf node member.

20. The apparatus of claim 18, wherein the node change module is configured to perform the node change corresponding to a lower level node prior to a higher level node.

21. The apparatus of claim 20, wherein, when the sub-root node is a top node of ancestor nodes whose descendent leaf node members all leave with an exception of one leaf node corresponding to descendant nodes, the node change module is configured to change the sub-root node to be the leaf node, and change a member corresponding to the one leaf node to be a member corresponding to the leaf node that was changed from being the sub-root node.

22. The apparatus of claim 18, wherein the node change module is configured to replace a parent node of the sub-root node with a sibling node of the sub-root node when the sub-root node is a highest level node among ancestor nodes whose descendent leaf node members all leave, and wherein, when a descendant node of the sibling node exists, the node change module is configured to change the descendant node of the sibling node to be a descendant node corresponding to the parent node being replaced with the sibling node.

23. The apparatus of claim 18, wherein the node key update module comprises:

an update target node selection module configured to select an update target node among nodes on the changed binary tree; and a target node update module configured to update a key of the update target node by updating a key of a parent node of a node corresponding to the updated key, using the updated key, the target node update module comprising a use node establishment module configured to establish one of two child nodes of the parent node of the node corresponding to the updated key as an update use node when keys of the two child nodes are updated, wherein the use node establishment module is configured to compare node IDs of the two child nodes prior to establishing the one of the two child nodes as the update use node.

24. The apparatus of claim 23, wherein the target node update module further comprises an update performing module configured to update the key of the parent node using the update use node.

25. The apparatus of claim 24, wherein the node key update module further comprises:

a transmission module configured to encode the key of the parent node, and transmit the encoded key to a group member corresponding to a node other than the update use node among the two child nodes, in correspondence to the node other than the update use node.

26. The apparatus of claim 25, wherein the transmission module is configured to transmit the encoded key of the parent node to a key of the node other than the update use node.

27. The apparatus of claim 25, wherein the update performing module is configured to establish an output of a one-way function with respect to the key of the update use node as the key of the parent node.

28. The apparatus of claim 27, wherein the one-way function is configured to receive the key of the update use node and update information.

\* \* \* \* \*